United States Patent
Toushin

[19]

[11] Patent Number: 5,990,196
[45] Date of Patent: Nov. 23, 1999

[54] SURFACE-LAYER STRUCTURE OF SOIL HAVING WEED EMERGENCE INHIBITOR ACTIVITY AND METHOD OF WEED EMERGENCE INHIBITION

[75] Inventor: Kazumi Toushin, 2105 Hayashi, Kurashiki-shi, Okayama 710-01, Japan

[73] Assignees: Yoshiyuki Naoi; Kazumi Toushin, both of Okayama, Japan; a part interest

[21] Appl. No.: 09/029,381

[22] PCT Filed: Aug. 29, 1996

[86] PCT No.: PCT/JP96/02465

§ 371 Date: Feb. 26, 1998

§ 102(e) Date: Feb. 26, 1998

[87] PCT Pub. No.: WO97/08940

PCT Pub. Date: Mar. 13, 1997

[30] Foreign Application Priority Data

Sep. 1, 1995 [JP] Japan ..................................... 7-248802

[51] Int. Cl.$^6$ ........................... A01G 13/00; C04B 32/00; C09K 17/02
[52] U.S. Cl. ........................... 523/132; 523/129; 523/212; 405/129; 405/270; 405/303; 260/DIG. 14; 106/900
[58] Field of Search ..................................... 523/212, 129, 523/132; 405/129, 270, 303; 260/DIG. 14; 106/900

[56] References Cited

U.S. PATENT DOCUMENTS

| 4,565,468 | 1/1986 | Crawford | 405/129 |
| 5,500,245 | 3/1996 | Toushin | 427/221 |

FOREIGN PATENT DOCUMENTS

| 0234504 | 9/1987 | European Pat. Off. | 405/270 |
| 0029718 | 2/1982 | Japan | 405/270 |
| 5-244834 | 9/1993 | Japan | A01G 13/00 |
| 6-206755 | 7/1994 | Japan | C04B 32/00 |
| 83/00516 | 2/1983 | WIPO | 405/270 |

*Primary Examiner*—Andrew E. C. Merriam
*Attorney, Agent, or Firm*—Michael D. Bednarek; Crowell & Moring LLP

[57] ABSTRACT

The present invention provides a ground surface structure for prevention of weed growing. The structure includes a germination-preventing sheet (2) resistant to penetration of buds of a plant and laid over the surface of a selected ground (1). The structure also includes a surface layer (3) formed by accumulating a water-repellent earth material on the germination-preventing sheet (2). The earth material includes material grains formed with silicone coating. Typically, the germination-preventing sheet (2) is made of a nonwoven fabric material and resistant to penetration of buds of a plant. Further, the sheet blocks the passage of light, but exhibits water permeability and air permeability.

10 Claims, 2 Drawing Sheets

SURFACE-LAYER STRUCTURE OF SOIL HAVING WEED EMERGENCE INHIBITOR ACTIVITY AND METHOD OF WEED EMERGENCE INHIBITION

TECHNICAL FIELD

The present invention relates to a ground surface structure for prevention of weed growing at median strip of a highway, an athletic ground, a tee ground of a golf course and the like. The present invention also relates to a method of preventing weed growing by utilizing such a ground surface structure.

BACKGROUND ART

The inventor of the present invention has proposed an earth material (U.S. Pat. No. 5,500,245) subjected to water-repellent treatment for prevention of weed growing at specific regions such as median strip of a highway. The earth material is made by a method including the steps of: heating a starting earth material for drying, wherein the starting material is selected from the group consisting of soil, sand, gravel, pebbles, silicon-containing combustion ash of household refuses and silicon-containing combustion ash of industrial refuses; preparing an emulsion of silicone oil in water; soaking the earth material with the emulsion; and heating the soaked earth material for drying.

In general, the water-repellent earth material has a grain size of no greater than 10 mm. In use, the earth material is spread over the surface of a selected site to form a surface layer. The surface layer will be made to prevent or allow penetration of water depending on whether the water-repellent earth material contains fine dust particles or not.

Specifically, when the water-repellent earth material includes fine dust particles having a grain size smaller than 2 mm the distances between the earth material grains are made small. In this instance, the surface layer made of such an earth material will become resistant to water penetration. Therefore, rainwater is not allowed to penetrate downward through the surface layer, and water remaining on the surface layer will evaporate immediately due to solar heat and wind. Thus, no water is supplied to the inside of the surface layer. As a result, weed seeds carried onto the surface layer fail to germinate, so that weed growing is prevented.

On the other hand, when the water-repellent earth material does not include fine dust particles having a grain size smaller than 2 mm (this may be a case where fine dust particles smaller than 2 mm were removed beforehand by sieving for example), the resulting surface layer exhibits water permeability. Thus, water is absorbed through clearances between the grains of the water-repellent earth material and arrives at the bottom of the surface layer. Further, if there is some water remaining in the surface layer halfway therethrough, it will evaporate immediately. As a result, no water is supplied to the weed seeds carried onto the surface layer, thereby preventing the weed growing.

As described above, the surface layer made of a water-repellent earth material, whether allowing water penetration or not, can check the germination of weed seeds carried onto the layer. However, there is also a problem that weed growing at the site is not completely prevented. This is because weed seeds existing beforehand in the soil below the surface layer of the water-repellent earth material may germinate and grow upward through the surface layer. In particular, when the surface layer of the water-repellent earth material allows water penetration, the above problem is not avoidable since water supply to the weed seeds is possible.

DISCLOSURE OF THE INVENTION

It is, therefore, an object of the present invention to provide a ground surface structure for preventing weed growing even if weed seeds exist in soil under a surface layer made of a water-repellent earth material.

Another object of the present invention is to provide a method of preventing weed growing with the use of such a ground surface structure.

According to a first aspect of the present invention, there is provided a ground surface structure for prevention of weed growing comprising: a germination-preventing sheet laid over a surface of a selected site wherein the sheet is resistant to penetration of buds of a plant; and a surface layer formed by accumulating a water-repellent earth material on the germination-preventing sheet wherein the earth material includes material grains formed with silicone coating.

With such an arrangement, weed growing is advantageously prevented even if weed seeds exist below the germination-presenting sheet, since the sheet is resistant to penetration of the buds extending from the seeds. Further, weed seeds carried onto the surface layer of the water-repellent earth material are not supplied with water (due to evaporation and/or downward escaping toward the germination-preventing sheet). Therefore, it is possible, in this instance again, to prevent weed growing.

The surface layer of the water-repellent earth material may be made to prevent or allow water penetration. In order to obtain a surface layer capable of preventing water penetration, clearances between the material grains are made smaller by mixing the water-repellent earth material having a grain size of no greater than 10 mm with fine dust particles having a grain size of less than 2 mm. On the other hand, in order to obtain a surface layer allowing water penetration, fine dust particles having a grain size of less than 2 mm are removed by sieving from the water-repellent earth material having a grain size of no greater than 10 mm.

The germination-preventing sheet may be formed with an opening to allow intended planting of a vegetable. With such an arrangement, it is possible to selectively grow a desired plant at a predetermined site, while preventing weed growing. In this way, the present invention can contribute to improving the scenery of a city.

While being resistant to penetration of buds of weed seeds, it is preferable that the germination-preventing sheet may also be arranged to block passage of light, but to allow penetration of water and air. By using a germination-preventing sheet capable of blocking passage of light, supply of the sunbeam necessary for the seeds to germinate is directly cut off, thereby checking the growth of the seeds. When the germination-preventing sheet allows water penetration, moisture (such as rainwater) is guided into the soil below the sheet, so that water does not remain at the surface layer. Further, when the germination-preventing sheet allows air penetration, the soil below the sheet does not suffer from suffocation. This arrangement is advantageous in planting a desired vegetable through an opening formed at a predetermined position in the sheet, as previously described.

Typically, the germination-preventing sheet is made of a nonwoven fabric. However, a woven fabric material may be used for making of the germination-preventing sheet as long as the material meets predetermined property requirements.

The water-repellent earth material may be selected from a group consisting of soil, sand, gravel, pebbles, silicon-containing combustion ash of household refuses and silicon-containing combustion ash of industrial refuses.

Specifically, the water-repellent earth material may be made by a method including the steps of: drying a selected starting earth material; preparing an emulsion of silicone oil in water; soaking the earth material with the emulsion; and heating the soaked earth material for drying. Thus obtained water-repellent earth material may be uniformly spread over the germination-preventing sheet in thickness of 1–10 cm for example, to form a surface layer.

According to a second aspect of the present invention, there is provided a method of preventing weed growing at a ground which includes the steps of: laying a germination-preventing sheet over a surface of a selected site, wherein the sheet is resistant to penetration of buds of a plant; and forming a surface layer by accumulating a water-repellent earth material on the germination-preventing sheet, wherein the earth material includes material grains formed with silicone coating.

Other objects, features and advantages of the present invention will become clearer from the embodiments described below with reference to the accompanying drawings.

BEST MODE FOR CARRYING OUT THE INVENTION

The present invention may be carried out in various ways, though only two embodiments typical of the present invention will be described below.

[Embodiment 1]

Figure 1:
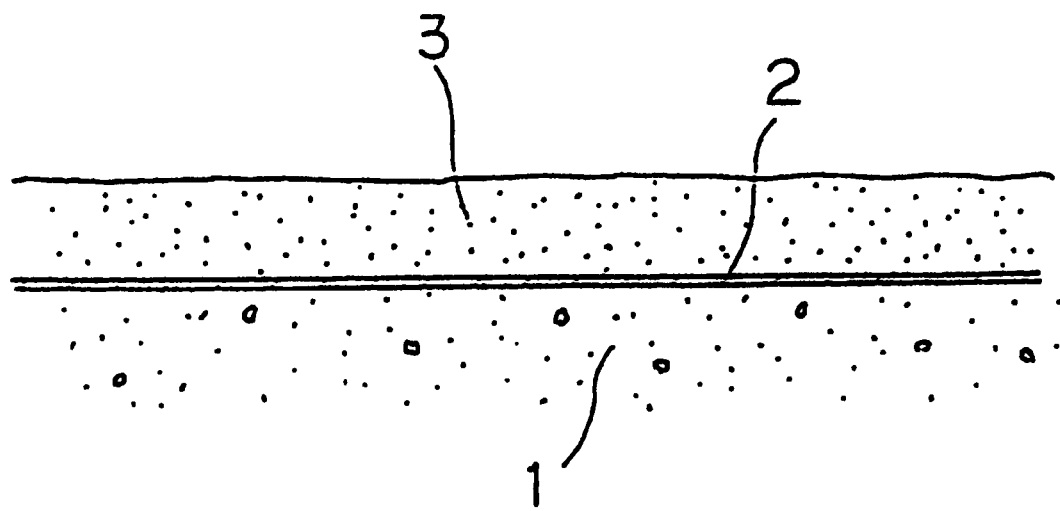
FIG. 1 is a sectional view illustrating a ground surface structure for prevention of weed growing according to the first embodiment of the present invention.

FIG. 1 illustrates a first embodiment of the present invention. In this embodiment, only the prevention of weed growing in a predetermined area is taken into consideration.

In FIG. 1, a selected site to be treated for prevention of weed growing is indicated by reference numeral 1. The selected site 1 is not limitative, and it may be median strip of a highway, an athletic ground, or a tee ground of a golf course for example.

A germination-preventing sheet 2 is laid over the surface of the selected site 1 with no clearance present therebetween. The germination-preventing sheet 2 has excellent light-blocking properties and exhibits excellent resistance to penetration of buds of a plant. Thus, the sheet prevents the germination of weed seeds in the selected site by blocking the passage of light. Further, even if the seeds germinate, the buds cannot pierce through the sheet 2. The germination-preventing sheet 2 also exhibits excellent air permeability and water permeability. It is preferable that the germination-preventing sheet 2 has excellent weatherability and durability.

In the illustrated embodiment, a high-density spunbond nonwoven sheet made of commercially available polyester fabric is used for the germination-preventing sheet 2. However, other nonwoven materials or other fabrics may be used for the germination-preventing sheet 2 as long as they properly block the passage of light, prevent the penetration of buds, exhibit excellent permeability for air and water, and have excellent weatherability and durability.

A surface layer 3 capable of preventing water permeation is formed by uniformly spreading a water-repellent earth material over the germination-preventing sheet 2. As previously described, the water-repellent earth material is made by a method including the steps of: drying a starting earth material selected from the group consisting of soil, sand, gravel, pebbles, silicon-containing combustion ash of household refuses and silicon-containing combustion ash of industrial refuses; preparing an emulsion of silicone oil in water; soaking the earth material with the emulsion; and heating the soaked earth material for drying. According to this method, the surfaces of the earth material grains are formed with water-repellent silicone coating.

The grain size of the water-repellent earth material is typically no greater than 10 mm, and preferably no greater than 2 mm. The surface layer 3 made of the water-repellent earth material typically has a thickness of 1–10 cm, and preferably of 5–10 cm. However, the thickness of the surface layer 3 may be determined suitably depending on the conditions of the selected site 1. For example, the thickness may be made small for median strip, which people or cars do not enter. On the other hand, the thickness may be rendered rather great for an athletic ground or a tee ground of a golf course, upon which people set foot, or for a slope, where the water-repellent earth material is liable to slide down due to strong wind or heavy rain.

As previously described, rainwater cannot penetrate the surface layer 3 made of the water-repellent earth material, and rainwater left on the surface will evaporate immediately due to solar heat and wind. Thus, weed seeds carried by the wind to the treated site are not supplied with water, and therefore fail to germinate. In this way, the germination of the weed seeds at the selected site 1 is prevented almost completely by using the germination-preventing sheet 2 and the water-repellent surface layer 3 in combination.

Description will be made below in further detail of the method of making the water-repellent earth material of the above embodiment.

First, sand from a river is used for a starting earth material. This material is subjected to screening by a known sieve device (not shown) to have grain size up to 10 mm (preferably no greater than 2 mm).

Then, the starting earth material is heated to a temperature of about 180–200° C. for drying to a water content of up to 5%. Such drying is performed for about 2–3 minutes while agitating in a mixer (not shown). It should be appreciated that the heating temperature and time should be suitably determined depending on the kind, volume and the like of the starting earth material.

Then, 3 parts by volume of silicone oil is mixed with 1,000parts by volume of water and agitated in a mixer (not shown) to form an emulsion of silicone oil in water. The mixture ratio between silicone oil and water should be suitably determined depending on the kind, grain size and the like of the starting earth material.

Then, the above emulsion is mixed with the dried starting earth material and agitated to become uniform in a mixer (not shown). The mixture ratio may be 20 liters of the emulsion to 1 ton of the dried earth material, and the mixture may be stirred at normal temperature for about 10 minutes.

Finally, the obtained mixture is dried in a drier (not shown) for water evaporation at a temperature of 180–200° C. As a result water-repellent earth material is obtained wherein silicone coating is formed on the surfaces of the grains.

[Embodiment 2]

Figure 2:
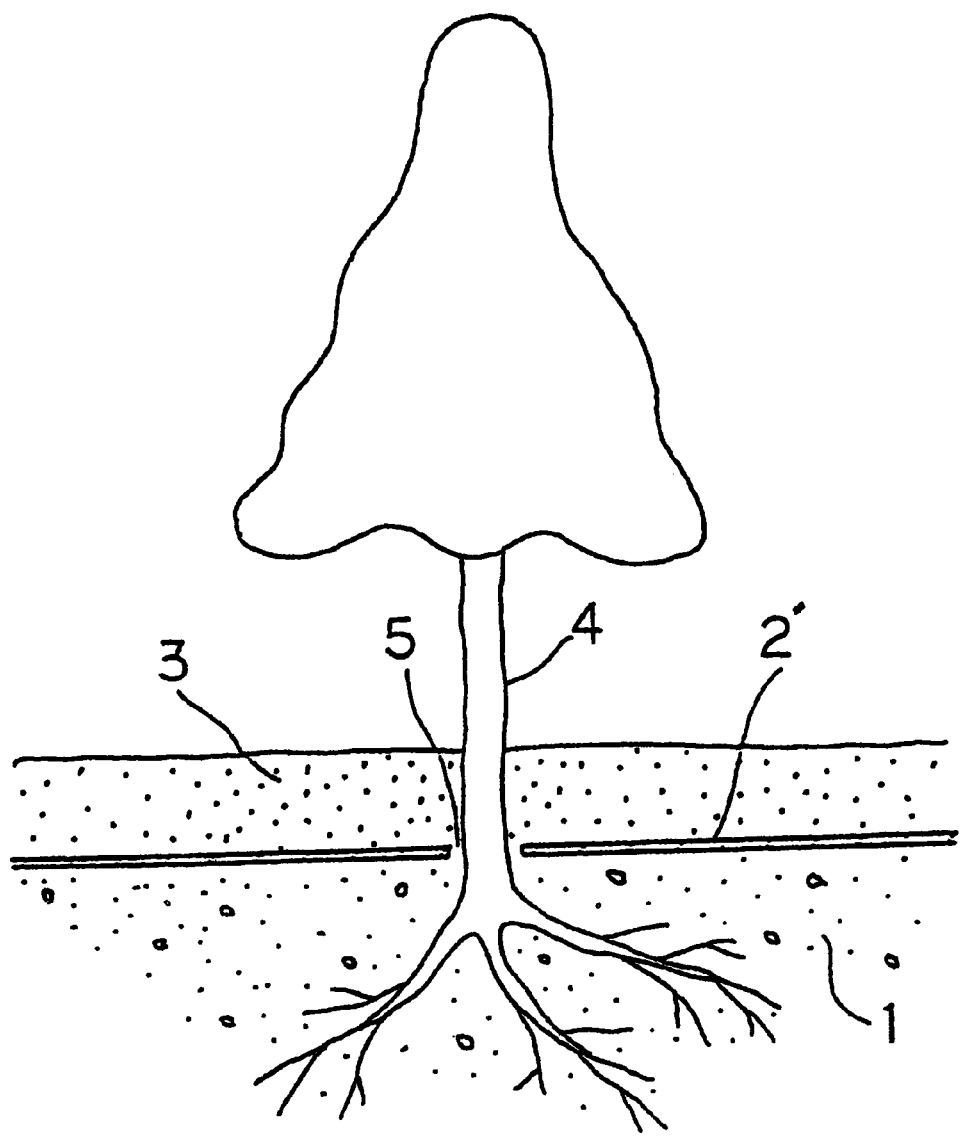
FIG. 2 is a sectional view illustrating a ground surface structure for prevention of weed growing according to the second embodiment of the present invention.

FIG. 2 illustrates a second embodiment of the present invention. According to the second embodiment, a vegetable such as a tree can be planted only at a predetermined site in a park, while weed growing is prevented around the vegetable.

In the second embodiment, a germination-preventing sheet 2' similar to that of the first embodiment is laid over the surface of a selected site 1. The sheet 2' has a predetermined section formed with an opening 5 cut open with a cutter for example. The opening 5 allows passage of the vegetable 4 planted at the selected site 1. The size of the opening 5 is determined considering the growth of the vegetable 4.

A surface layer 3 is formed on the germination-preventing sheet 2' by spreading a water-repellent earth material with a thickness of 1–10 cm (preferably 5–10 cm). In this embodiment, the water-repellent earth material has a grain size of 2–6 mm, so that the surface layer exhibits water permeability and air permeability. Thus, rainwater or sprinkled water can penetrate through the surface layer 3 and the sheet 2' into the selected site 1. Thus, the growth of the vegetable 4 is not hindered. On the other hand, the surface layer 3 itself does not hold moisture, thereby preventing the budding of weed seeds carried onto the surface layer 3. Further, weeds contained in the selected site 1 below the germination-preventing sheet 2' cannot grow upward beyond the germination-preventing sheet 2', which is resistant to the penetration of the weeds.

We claim :

1. A ground surface structure for prevention of weed growing comprising: a germination-preventing sheet laid over a surface of a selected site, the sheet being resistant to penetration of buds of a plant; and a surface layer formed by accumulating a water-repellent earth material on the germination-preventing sheet, the earth material including grains formed with silicone coating; wherein the germination-preventing sheet is entirely buried under the surface layer of the water-repellent earth material; and wherein the surface layer allows water penetration.

2. The ground surface structure according to claim 1, wherein the germination-preventing sheet further blocks passage of light, but allows penetration of water and air.

3. The ground surface structure according to claim 2, wherein the germination-preventing sheet is made of a nonwoven fabric.

4. The ground surface structure according to claim 2, wherein the germination-preventing sheet has an opening for permitting intended planting of a plant.

5. The ground surface structure according to claim 1, wherein the water-repellent earth material is selected from a group consisting of soil, sand, gravel and pebbles.

6. A method of preventing weed growing at a ground, the method comprising the steps of: laying a germination-preventing sheet over a surface of a selected site, the sheet being resistant to penetration of buds of a plant; and forming a surface layer by accumulating a water-repellent earth material over an entire surface of the germination-preventing sheet, the earth material including grains formed with silicone coating; wherein the surface layer allows water penetration.

7. The method according to claim 6, wherein the germination-preventing sheet further blocks passage of light, but allows penetration of water and air.

8. The method according to claim 6, wherein the germination-preventing sheet is made of a nonwoven fabric.

9. The method according to claim 6, wherein the germination-preventing sheet has an opening for permitting intended planting of a plant.

10. The method according to claim 6 wherein the water-repellent earth material is selected from a group consisting of soil, sand, gravel and pebbles.

* * * * *